(12) United States Patent
Barbarin et al.

(10) Patent No.: US 10,780,745 B2
(45) Date of Patent: Sep. 22, 2020

(54) INCISED TREAD FOR CIVIL ENGINEERING TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Francois Barbarin, Clermont-Ferrand (FR); Guillaume Demaziere, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 629 days.

(21) Appl. No.: 15/320,949

(22) PCT Filed: Jun. 16, 2015

(86) PCT No.: PCT/EP2015/063446
§ 371 (c)(1),
(2) Date: Dec. 21, 2016

(87) PCT Pub. No.: WO2015/197429
PCT Pub. Date: Dec. 30, 2015

(65) Prior Publication Data
US 2017/0157989 A1    Jun. 8, 2017

(30) Foreign Application Priority Data
Jun. 24, 2014 (FR) ..................... 14 55866

(51) Int. Cl.
*B60C 11/12* (2006.01)
*B60C 11/03* (2006.01)
*B60C 11/04* (2006.01)

(52) U.S. Cl.
CPC ........ *B60C 11/1218* (2013.01); *B60C 11/033* (2013.01); *B60C 11/0306* (2013.01);
(Continued)

(58) Field of Classification Search
CPC . B60C 11/0311; B60C 11/1218; B60C 11/04; B60C 11/033; B60C 2011/1209; B60C 2011/1227
See application file for complete search history.

(56) References Cited

U.S. PATENT DOCUMENTS

2002/0053383 A1* 5/2002 Kleinhoff .............. B29C 33/301
152/209.18
2004/0211502 A1* 10/2004 Ono ........................ B60C 11/00
152/209.19
(Continued)

FOREIGN PATENT DOCUMENTS

JP    04-306106 A  * 10/1992
JP    2002-248910 A  * 9/2002
(Continued)

OTHER PUBLICATIONS

Machine translation for Japan 2008-013037 (Year: 2019).*
Machine translation for Japan 04-306104 (Year: 2019).*
Machine translation for Japan 2002-248910 (Year: 2019).*

*Primary Examiner* — Steven D Maki
(74) *Attorney, Agent, or Firm* — Dickinson Wright PLLC; Steven Hurles

(57) ABSTRACT

The tread has a total width W and is provided with circumferential cuts that have a mean depth at least equal to 70 mm and at most equal to the thickness of wearable material. The circumferential cuts divide the tread into a middle region (Continued)

with an axial width Wm of 50% to 80% of the total width W. The middle region has transverse or oblique sipes opening into the circumferential cuts and closing at least in part when they enter the contact patch. The sipes have a depth at least equal to 75% of the depth of the circumferential cuts and delimit elements of material of height equal to the mean depth H of the said sipes and of circumferential length B equal to the mean distance between two sipes. For all the elements of material, the ratio H/B is greater than 0.5 and at most equal to 2.5.

14 Claims, 2 Drawing Sheets

(52) U.S. Cl.
CPC ....... *B60C 11/0311* (2013.01); *B60C 11/1236* (2013.01); *B60C 11/1259* (2013.01); *B60C 11/04* (2013.01); *B60C 2011/0355* (2013.01); *B60C 2011/0367* (2013.01); *B60C 2011/1209* (2013.01); *B60C 2011/1227* (2013.01); *B60C 2200/065* (2013.01)

(56) References Cited

U.S. PATENT DOCUMENTS

| | | | |
|---|---|---|---|
| 2007/0199633 A1* | 8/2007 | Hayashi | B60C 11/0311 152/209.18 |
| 2010/0006197 A1* | 1/2010 | Kuroishi | B60C 11/0311 152/209.18 |
| 2013/0206299 A1 | 8/2013 | Yoda | |
| 2015/0107741 A1* | 4/2015 | Hasegawa | B60C 11/0311 152/209.25 |
| 2016/0332488 A1* | 11/2016 | Araki | B60C 11/0311 |

FOREIGN PATENT DOCUMENTS

| | | | |
|---|---|---|---|
| JP | 2004262295 | | 9/2004 |
| JP | 2007191093 | | 8/2007 |
| JP | 2008-013037 A | * | 1/2008 |
| JP | 2008114738 | | 5/2008 |

\* cited by examiner

SECTION ON II-II

INCISED TREAD FOR CIVIL ENGINEERING TIRE

CROSS-REFERENCE TO RELATED APPLICATION

The present invention claims priority to PCT International Patent Application Serial No. PCT/EP2015/063446 filed Jun. 16, 2015 entitled "Incised Tread For Civil Engineering Tire," which claims the benefit of FR Patent Application Serial No. 1455866 filed Jun. 24, 2014, the entire disclosures of the applications being considered part of the disclosure of this application and hereby incorporated by reference.

BACKGROUND OF THE INVENTION

1. Field of the Invention

The present invention relates to treads of tires for vehicles carrying heavy loads and driving over uneven ground such as in mines. This invention relates more particularly to the tread pattern of such treads.

2. Related Art

In order to ensure satisfactory grip both in traction and under braking, it is necessary to form a somewhat complex tread pattern on a tread using a system of cuts and of cavities. These cuts and cavities form a tread pattern both on the surface referred to as the tread surface that is intended to come into contact with the ground and within the thickness of the tread.

It is known practice, notably from patent document FR 1452048, to form wide cuts (referred to as "grooves") and narrow cuts (referred to as "sipes"). The sipes have widths suited to close up again at least in part when they enter the contact patch in which the tire is in contact with the roadway. Thus, it is possible to benefit from the presence of edge corners formed at the intersection of the cuts with a tread surface while at the same time maintaining sufficient tread stiffness once the opposing walls have come into contact with one another.

A need to improve the wearing performance of treads while at the same time encouraging the flattening of the tire reinforcing structure has become apparent.

Definitions:

In this document a radial direction means a direction perpendicular to the axis of rotation of the tire (this direction corresponds to the direction of the thickness of the tread).

A transverse or axial direction means a direction parallel to the axis of rotation of the tire.

A circumferential direction means a direction tangential to any circle centered on the axis of rotation. This direction is perpendicular both to the axial direction and to a radial direction.

The equatorial median plane is a plane perpendicular to the axis of rotation and passing through the points on the tire that are radially furthest away from the said axis. In the case of a tread, this plane divides the tread widthwise into two halves of equal widths.

A rib is a raised element formed on a tread, this element extending in the circumferential direction, and generally making a complete circuit of the tire. A rib comprises two lateral walls and a contact face, the latter forming part of the tread surface and being intended to come into contact with the roadway during running.

In the present document, a cut refers generically either to a groove or to a sipe and corresponds to the space delimited by walls of material facing one another and distant from one another by a distance (referred to as the "width of the cut"). It is precisely this distance that differentiates a sipe from a groove; in the case of a sipe, this distance is suited to allowing opposing walls delimiting the said sipe to come at least partially into contact at least when the sipe is in the contact patch in which the tire is in contact with the roadway. In the case of a groove, the walls of this groove cannot come into contact with one another under normal running conditions.

A tread has a maximum thickness of material that can be worn away during running; once this maximum thickness has been reached, the tire may be replaced by a new tire or alternatively retreaded, which means to say provided with a new tread. The volume of wearable material corresponds, in the case of the tires of the invention, to the quantity of material situated between the tread surface when new and a virtual surface parallel to the tread surface when new and passing through the points of the cuts formed in the tread that are furthest towards the inside.

The void surface ratio of a tread pattern is equal to the ratio between the surface area of the voids formed by the cuts and cavities and the total surface area (contact surface area of the raised elements and surface area of the voids). A low void ratio indicates a large contact surface area of the raised elements and a low surface area of voids between these elements.

The void volume ratio of a tread pattern when new is equal to the ratio between the volume of the voids (formed notably by cuts, cavities) formed in the tread and the total volume of the said tread comprising the volume of wearable material and the volume of the voids. A low void volume ratio indicates a low volume of voids in comparison with the volume of wearable material of the tread. Likewise, it is possible to define a volume ratio for a region of a tread, this region being delimited axially.

The usual running conditions for the tire, or conditions of use, are those notably defined by the E.T.R.T.O standard for use in Europe or any other equivalent standard according to the country concerned; these conditions of use specify the reference inflation pressure corresponding to the load bearing capability of the tire as indicated by its load rating and its speed rating. These conditions of use may also be referred to as nominal conditions or usual conditions.

The prior art notably comprises documents JP 2008 114738 A, JP 2004 262295 A, JP 2007 191093 A, which describe treads for a tire of a vehicle carrying very heavy loads. None of these documents describes or suggests a specific relationship associated with the elements of material individually demarcated by cuts.

BRIEF SUMMARY OF THE INVENTION

The present invention seeks to propose a tread for a tire of a vehicle carrying very heavy loads and running in mines over uneven ground which may be particularly aggressive on the tires. The tread according to the invention has a tread pattern design that allows both an improvement in the wearing performance while at the same time maintaining appropriate levels of grip, doing so whatever the degree of tread wear. This invention is more particularly applicable to very wide treads, namely treads of a width at least equal to 700 millimetres (mm). Furthermore, the use to which these tires are put is heavily contrasted in terms of loading: the outward journey is at full load and the return journey is made unladen, with no intermediate loading scenario. During the phases of unladen running, the load of the rear tires is approximately one third of that of the phases of running under full load. During the phases of unladen running, almost all of the load is borne by a middle zone of the tread.

For that reason, one subject of the invention is a tread for a tire of a vehicle carrying very heavy loads, this tread having a total width W and a thickness of wearable material, this tread being provided with at least two cuts of circumferential overall orientation and of depth at least equal to 70 mm and at most equal to the thickness of wearable material, these cuts dividing the tread into a middle region, and shoulder regions axially delimiting the tread. The middle region is defined as the region of the tread situated between the two circumferential cuts axially furthest away from the equatorial median plane. This middle region has an axial width at least equal to 50% and at most equal to 80% of the total width W of the tread.

This tread is such that the middle region comprises a plurality of transverse or oblique sipes opening into the circumferential cuts, these sipes closing at least in part when they enter the contact patch and having a depth at least equal to 75% of the depth of the circumferential cuts, these sipes delimiting a plurality of elements of material of height equal to the mean depth H of the sipes and of circumferential length B equal to the mean distance between two sipes.

This middle zone is such that the ratio H/B is greater than 0.5 and at most equal to 2.5.

More preferably still, the ratio H/B is at least equal to 1.0 and at most equal to 2.0.

Advantageously, the void volume ratio Tc of the middle region is at least equal to 2% and at most equal to 12%. What is meant by the void volume ratio of the middle zone is the value of the ratio between the total volume of voids present in the middle zone of the tread according to the invention when new and the total volume of this middle zone, this total volume including the total volume of the voids.

For preference, the void volume ratio of the middle region is at least equal to 2% and at most equal to 6%.

In an advantageous alternative form of the invention, the void volume ratio is comprised between 2 and 12% (and more preferably still, between 2 and 6%) for the tread as a whole, while at the same time satisfying a void volume ratio of the middle region at least equal to 2% and at most equal to 12% (and more preferably still, between 2 and 6%).

Advantageously, the angle of the sipes is at least equal to 45° to the circumferential direction.

In the known way, the sipes formed in the tread according to the invention may be provided with blocking means that limit the relative movements of the opposing walls that delimit these sipes. These blocking means are all the more beneficial when the ratio H/B increases and when, with wear, the coefficient of friction between these walls decreases as a result of the presence of foreign bodies. In order to limit the reduction in tread stiffness caused by the presence of this plurality of sipes, it is sensible to ensure that at least some of the sipes comprise means for blocking the relative movements of the opposing walls that delimit these sipes.

In an advantageous alternative form of the invention, at least one shoulder region—a region axially limiting the tread—is provided with a plurality of transverse or oblique sipes opening on one side into a circumferential cut delimiting this shoulder region and on the other side onto the outside of the tread, these sipes closing at least in part when they enter the contact patch and having a depth at least equal to 75% of the depth of the circumferential cuts. These sipes delimit a plurality of elements of material of height equal to the mean depth H* of the transverse or oblique sipes and of circumferential length B* equal to the mean distance between two transverse or oblique sipes.

This shoulder region is such that the ratio H*/B* is greater than 0.5 and at most equal to 2.5. For preference, the shoulder region is such that the ratio H*/B* is at least equal to 1 and at most equal to 2.

According to an alternative form of the invention provision is made for the presence, in the circumferential direction, of an alternation of sipes provided with blocking means and of sipes not provided with such means. If the length between two sipes that are not provided with blocking means is denoted B', these two sipes flanking one sipe or several sipes that are provided with blocking means, then it is sensible for the ratio H/B' to be less than 1 or even more preferably still, less than 0.7.

It is known that the external shape of a tire is affected by the internal pressure of the tire. With this mechanism in mind, it is preferable for the axially outermost cuts to be positioned so that the width of the middle region is equal to at least 70% and at most 80% of the total width of the tread.

In an advantageous alternative form of the invention, provision is made for the use, at least in the middle region, of a rubber compound as described in one or other of patent applications FR 14/50965 and FR 14/50967, both filed in France on Jul. 2, 2014, This combination of a tread pattern with a low void ratio makes it possible to achieve an excellent compromise combining both a high level of stiffness beneficial to wear and a lowered level of heating in use.

Further features and advantages of the invention will become apparent from the description given hereinafter with reference to the attached drawings which, by way of non-limiting examples, show embodiments of the subject matter of the invention.

DETAILED DESCRIPTION OF THE ENABLING EMBODIMENT

In order to make the figures easier to study, the same reference signs are used to describe alternative forms of the invention where these reference signs refer to elements of the same either structural or indeed functional nature.

The figures serve to support the description without, however, claiming to show the alternative forms to scale.

Figure 1:
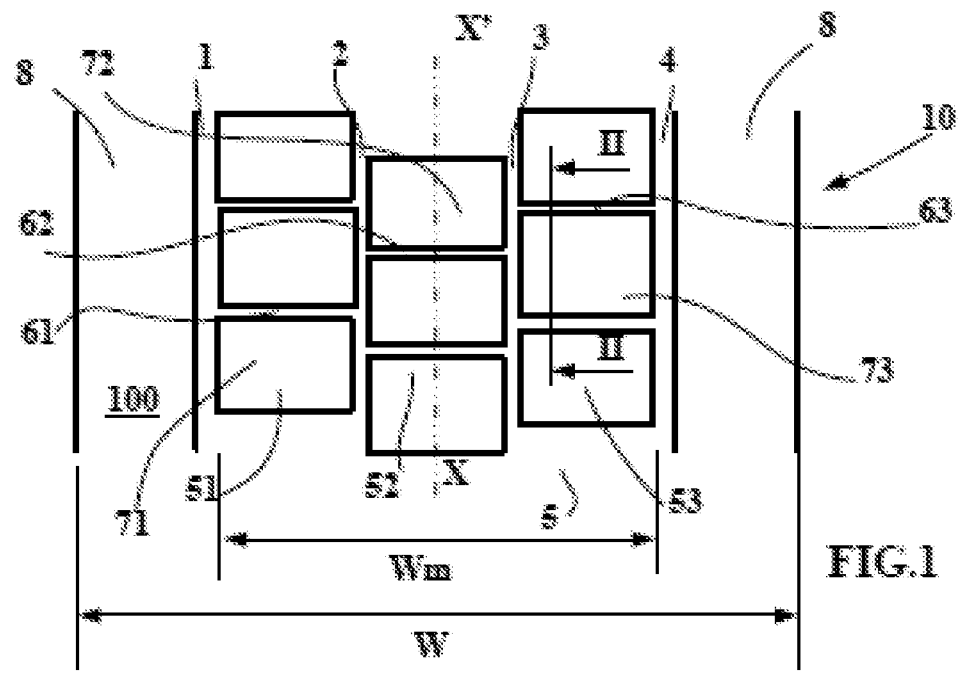
FIG. 1 depicts a partial plan view of the tread pattern of a tread according to a first alternative form.

FIG. 1 is a partial view of a first alternative form of a tread 10 of a tire according to the invention, shown in plan view.

This tread 10 is intended to equip a radial tire of size 40.00 R 57 itself intended to be fitted to a vehicle of the dumper type for carrying very heavy loads.

This tread 10 has a total width W equal to 997 mm and intended to come into contact with the ground via a tread surface 100 during running.

This tread 10 comprises four circumferential cuts 1, 2, 3, 4 of width equal to 8 mm on the tread surface of the tire when new and of a depth equal to 71 mm. In the bottom of each cut the width is equal to 6 mm (this height is measured at the limit of wear). These circumferential cuts have a width such that as they enter the contact patch the walls delimiting the said cuts come into contact with one another.

These circumferential cuts 1, 2, 3, 4 are arranged symmetrically with respect to the equatorial median plane identified by the line XX' in FIG. 1 and at distances equal to 100 mm and 300 mm (in the case of the axially outermost cuts) away from this median plane.

A middle region 5 is defined as being the region delimited axially by the two circumferential cuts 1 and 4 axially furthest away from one another. In this particular instance, the width Wm of this middle region 5 is equal to 606 mm.

This middle region 5 comprises three circumferential rows 51, 52, 53 each delimited by two circumferential cuts. Each circumferential row 51, 52, 53 is provided with a plurality of sipes 61, 62, 63 respectively, these sipes being oriented in the transverse direction perpendicular to the circumferential direction and therefore parallel to the direction of the axis of rotation of the tire provided with this tread. Each transverse sipe 61, 62, 63 opens at each end into a circumferential cut. Moreover, these transverse sipes are offset from one another in the circumferential direction from one row to another.

These transverse sipes with the circumferential cuts delimit, within each circumferential row 51, 52, 53, a plurality of elements of material 71, 72, 73 respectively the mean height of which corresponds to the mean depth of the said sipes and cuts.

Circumferentially continuous ribs which are not provided with sipes are formed axially on the outside of the middle region.

The tread 10 is bounded axially by shoulder regions 8 which are not provided with any transverse or oblique sipes.

Figure 2:
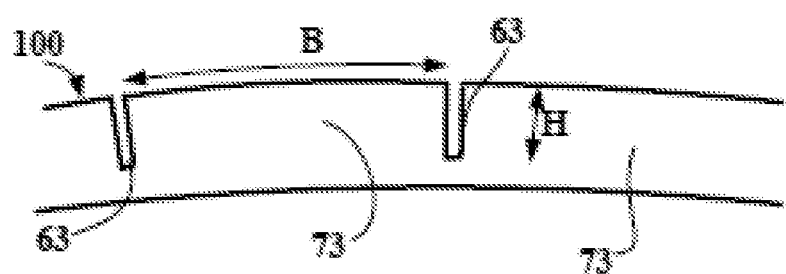
FIG. 2 is a section on a plan II-II the line of which is identified in the plan view shown in FIG. 1.

FIG. 2, which shows a partial view in section on a plane perpendicular to the axis of rotation, this section being identified by its line II-II in FIG. 1, shows the distribution of the sipes 63 formed in the circumferential row 53.

These sipes 63 have the following dimensional characteristics:
  mean depth H equal to 70 mm
  width equal to 8 mm at the surface; 6 mm in the bottom.

These sipes 63 together with the cuts 3 and 4 delimit a plurality of elements of material 73 having a height equal to the depth H of the sipes (namely 70 mm) and a circumferential length B on the tread surface 100 equal to 130 mm. The other transverse sipes 61, 62 have the same dimensional characteristics. This being so, the thickness of wearable material of the tread is equal to 71 mm.

Under usual conditions corresponding to a load of 60 tonnes and an inflation pressure equal to 6 bar, it is found that the sipes close partially as they enter the contact patch in which the tire is in contact with the ground; this contact between opposing walls affects around at least 33% of the surface area of the walls delimiting each sipe (which means to say that there is contact over at least 33%).

The sipes in this alternative form are not provided with any means for blocking the relative movements between the walls that delimit each sipe; in an alternative form that has not been shown, the sipes may in the known way be provided with such blocking means (corrugated or zigzag wall geometry, presence of a plurality of voids and bumps designed to engage with one another).

Under such conditions and between two sipes 63, the element of material therefore has a ratio H/B equal to 0.54 (=70/130). This same ratio H/B is found in the other two circumferential rows 51, 52.

Thanks to the provisions according to the invention which are described notably with this first alternative form, it has been possible appreciably to improve the integrity in terms of wear while at the same time maintaining an appropriate level of grip regardless of the degree of tread wear.

Figures 3, 4:
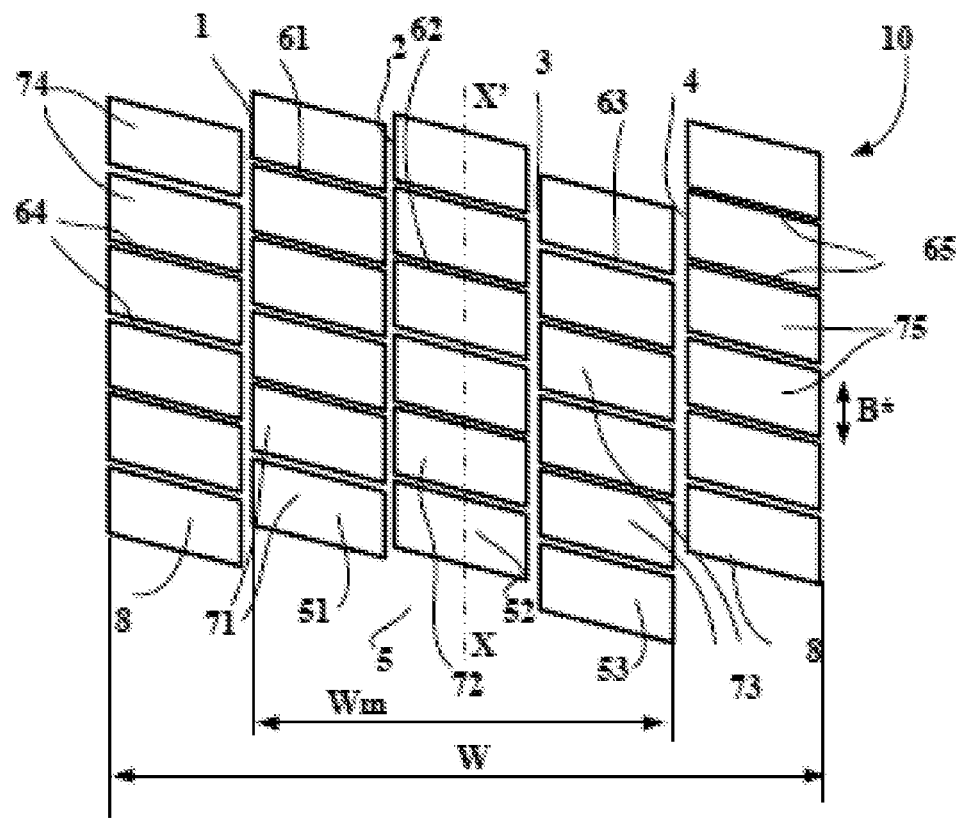
FIG. 3 shows a partial view of the tread pattern according to a second alternative form of the invention.
FIG. 4 shows another alternative form of the invention in cross section.

FIG. 3 shows a partial view of a tread according to a second alternative form of the invention.

The tire according to this alternative form is of the same dimension as for the first example of the invention, namely a tire of size 40.00 R 57. This tire is provided with a tread 10 of total width W equal to 997 mm.

This tread comprises four circumferential cuts 1, 2, 3, 4 which are 8 mm wide on the surface and 6 mm wide at the bottom of the tread pattern and of depth 71 mm.

These circumferential cuts 1, 2, 3, 4 are arranged symmetrically with respect to the equatorial median plane XX' and at distances equal to 100 mm and 300 mm from this plane. These circumferential cuts delimit circumferential rows two of which form shoulder regions 8.

A middle region 5 delimited axially by the two circumferential cuts 1, 4 that are axially furthest apart is defined. In this particular instance, the width Wm of the middle region is equal to 606 mm.

This middle region 5 comprises three circumferential rows 51, 52, 53 and, in each circumferential row, a plurality of sipes oriented obliquely with respect to the transverse direction, the angle of these oblique sipes being equal to 15°.

Each oblique sipe opens at each side into a cut and on each circumferential row 51, 52, 53 delimits a plurality of elements of material 71, 72, 73 respectively.

These oblique sipes of the middle region 5 have a mean depth H equal to 70 mm and alternate between having either a very small width (equal or close to zero) or a width equal to 8 mm at the surface of the tread.

The mean distance B between the sipes is equal to 65 mm.

This being so, the ratio H/B of the elements of material formed on the middle part is equal to 1.08 (=70/65).

Furthermore, each shoulder region 8 situated axially on the outside of the middle region 5 and axially bounding the tread 10 is provided with a plurality of oblique sipes 64, 65 respectively. These oblique sipes are oriented in one and the same oblique direction that makes an angle of 15 degrees with the axial direction, in the same way as the oblique sipes of the middle region. Each of the oblique sipes of the shoulder regions opens at one side into a circumferential cut and at the other side into the outside of the tread.

The oblique sipes 64, 65 formed on the shoulder regions have the following dimensional characteristics:
  a mean depth H* that varies across the width, this depth being on average equal to 45 mm;
  a width of close to 0 mm (in this case the opposing walls that delimit a sipe are in contact over at least part of the surface of these walls);
  the circumferential distance B* between two successive sipes is equal to 68 mm.

Between two shoulder-region sipes, each element of material has a ratio H*/B* equal to 0.66 (=45/68).

In this second alternative form, the middle region 5 and the shoulder regions 8 both satisfy the condition laid down by the invention, namely a ratio of height to circumferential length of between 0.5 and 2.5.

Another alternative form of the invention, a cross section of which is shown in FIG. 4, provides for the presence, in the circumferential direction of the circumferential grooves of the middle region, of an alternation of transverse sipes 8 provided with blocking means and of transverse sipes 7 not provided with such means. In the example shown, two sipes 7 not provided with blocking means flank two sipes 8 that are provided with such means (in this instance in the form of a zigzag geometry).

If the length between two sipes 7 that are not provided with blocking means is denoted B', then it is sensible for the ratio H/B' to be less than 1 or even more preferably still, less than 0.7 whereas the ratio H/B is greater than 0.5 and at most equal to 2.5. In these ratios, the parameter H represents the height of the elements of material formed by the sipes (this height is equal to the mean depth of these sipes). In the scenario shown, the ratio H/B is equal to 1.8 and the ratio H/B' is equal to 0.6. The advantage of such an alternative form lies in a better compromise between the stiffness of the tread in use and the ease of demoulding during manufacture.

The invention which has been described with the support of these examples should not of course be limited to these examples and various modifications can be made thereto without departing from the scope defined by the claims.

The invention claimed is:

1. A tread for a tire of a vehicle carrying very heavy loads, this tread having a total width W and a thickness of wearable material, this tread being provided with at least two cuts of circumferential overall orientation and of mean depth at least equal to 70 mm and at most equal to the thickness of wearable material, these circumferential cuts dividing the tread into a middle region, and shoulder regions axially delimiting the tread, the middle region being defined as the region of the tread situated between the two circumferential cuts axially furthest away from the equatorial median plane, this middle region having an axial width Wm at least equal to 50% and at most equal to 80% of the total width W of the tread, this tread being such that the middle region comprises a plurality of transverse or oblique sipes opening into the circumferential cuts, these transverse or oblique sipes closing at least in part when they enter the contact patch and having a depth at least equal to 75% of the depth of the circumferential cuts, these transverse or oblique sipes delimiting a plurality of elements of material of height equal to the mean depth H of the said sipes and of circumferential length B equal to the mean distance between two transverse or oblique sipes wherein, for all the elements of material which are delimited by two consecutive sipes in the middle region, the ratio H/B is greater than 0.5 and at most equal to 2.5;
   wherein the circumferential cuts extend in a straight direction around an entire circumference of the tread;
   wherein the sipes extend in a straight direction fully across the elements of material; and
   wherein the plurality of elements of material includes three circumferential rows of elements of material delimited by circumferential cuts, wherein the axially innermost circumferential cuts are offset from the equatorial median plane such that a middle circumferential row of elements of material is defined, and wherein the sipes of the elements of material of the middle circumferential row extend through the equatorial median plane.

2. The tread according to claim 1, wherein the ratio H/B is at least equal to 1.0 and at most equal to 2.0.

3. The tread according to claim 1, wherein the void volume ratio Tc of the middle region is at least equal to 2% and at most equal to 12%.

4. The tread according to claim 3, wherein the void volume ratio Tc of the middle region is at least equal to 2% and at most equal to 10%.

5. The tread according to claim 1, wherein the angle of the transverse or oblique sipes is at least equal to 45° to the circumferential direction.

6. The tread according to claim 1, wherein at least some of the transverse or oblique sipes comprise means for blocking relative movements of the opposing walls that delimit these sipes.

7. The tread according to claim 1, wherein at least one shoulder region—a region axially limiting the tread—is provided with a plurality of transverse or oblique sipes opening on one side into a circumferential cut delimiting this shoulder region and on the other side onto an axial outside of the tread, these transverse or oblique sipes closing at least in part when they enter the contact patch and having a depth at least equal to 75% of the depth of the circumferential cuts, and these transverse or oblique sipes delimiting a plurality of elements of material of height equal to the mean depth H* of the transverse or oblique sipes of the shoulder region and of circumferential length B* equal to the mean distance between two transverse or oblique sipes, this shoulder region being such that the ratio H*/B* is greater than 0.5 and at most equal to 2.5.

8. The tread according to claim 7, wherein the shoulder region is such that the ratio H*/B* is at least equal to 1 and at most equal to 2.

9. The tread according to claim 1, wherein the sipes include, in the circumferential direction, an alternation of sipes provided with blocking means and of sipes not provided with such blocking means, the blocking means being configured to limit the relative movement of the opposing walls that define the respective sipes with blocking means, two sipes not provided with blocking means flanking one sipe or several sipes that are provided with blocking means.

10. The tread according to claim 9, wherein the distance B' between two sipes that are not provided with blocking means is such that the ratio H/B' is less than 1.

11. The tread according to claim 10, wherein the distance B' between two sipes that are not provided with blocking means is such that the ratio H/B' is less than 0.7.

12. The tread according to any claim 1, wherein the void volume ratio of the tread as a whole is comprised between 2 and 12% and in that the void volume ratio of the middle region of the tread is at least equal to 2% and at most equal to 14%, and more preferably comprised between 2% and 10%.

13. A tire comprising a tread constructed according to claim 1, wherein the width Wm of the middle region is equal to at least 70% and at most 80% of the total width W of the tread.

14. The tread according to claim 1, wherein adjacent circumferential rows are offset circumferentially such that the sipes opening into the circumferential cuts terminate at the circumferential cuts, each of the sipes being offset from the sipes in adjacent circumferential rows.

* * * * *